UNITED STATES PATENT OFFICE.

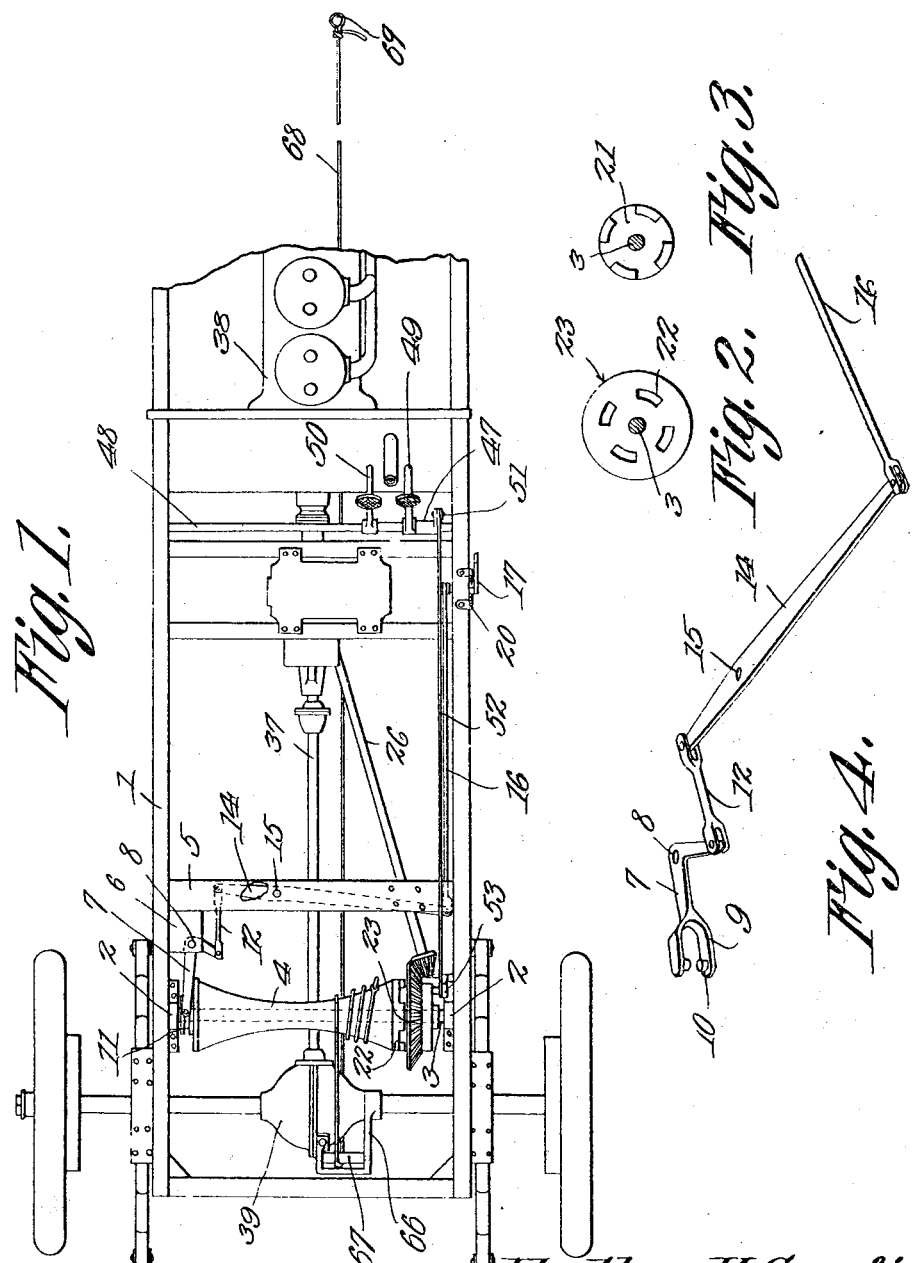

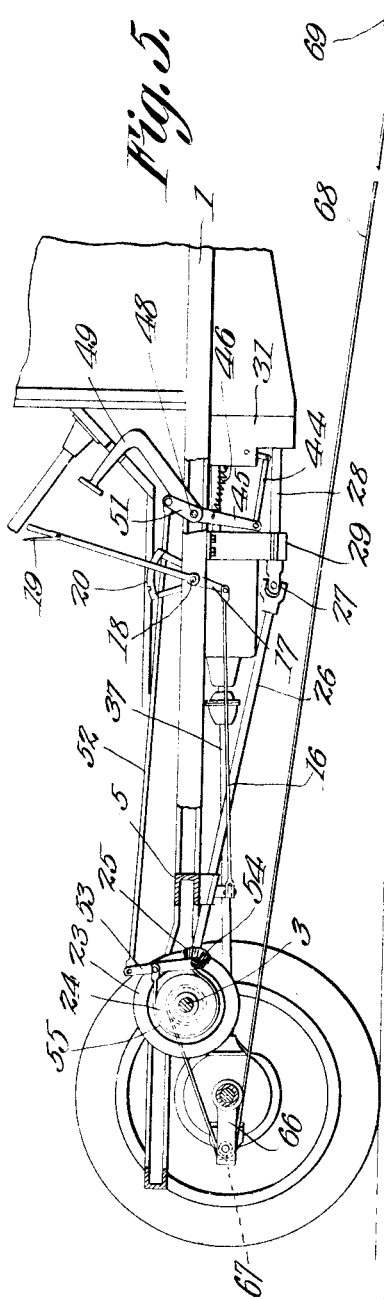

EARTHEN H. CAMFIELD AND CHRISTIAN O. NIELSEN, OF COLORADO SPRINGS, COLORADO.

AUTOMOBILE-PULLER.

1,111,211.

Specification of Letters Patent.   Patented Sept. 22, 1914.

Application filed May 25, 1913.  Serial No. 770,735.

*To all whom it may concern:*

Be it known that we, EARTHEN H. CAMFIELD and CHRISTIAN O. NIELSEN, citizens of the United States, residing at Colorado Springs, in the county of El Paso, State of Colorado, have invented a new and useful Automobile-Puller, of which the following is a specification.

The device forming the subject matter of this application, is adapted to be assembled with any automobile or motor propelled vehicle of standard construction, for the purpose of pulling the same out of the mire, or dislodging the vehicle from any like objectionable position.

One object of the present invention is to provide novel means for actuating and controlling the drum whereby motion is imparted to the vehicle.

Another object of the invention is to provide novel means for operatively connecting the drum actuating mechanism with the engine whereby the vehicle is propelled.

It is within the scope of the invention to improve generally, and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 shows in top plan, a motor propelled vehicle equipped with the device constituting the subject matter of this application; Fig. 2 is an end elevation of one of the clutch members whereby the actuating drum is operatively connected with the prime mover; Fig. 3 is an elevation of the clutch member which coöperates with the clutch member shown in Fig. 2; Fig. 4 is a perspective showing a portion of the mechanism whereby the drum is slid longitudinally, so as to cause the clutch members to coact; Fig. 5 is a side elevation of the complete mechanism, parts appearing in section; Fig. 6 is a transverse section through the mechanism whereby the engine is connected to and disconnected from the drum actuating means;
Fig. 7 is a sectional detail illustrating in elevation, the mechanism shown in Fig. 6;
Fig. 8 is a plan showing a slight modification.

In the drawings, the numeral 1 indicates the frame of a motor propelled vehicle. The frame 1 is provided, preferably at a point adjacent its rear end, with oppositely disposed bearings 2 in which is journaled for rotation a shaft 3. Mounted upon the shaft 3, to slide longitudinally thereon is a drum 4 which, as shown, is tapered from its ends toward its intermediate portion.

Referring to the mechanism whereby the drum 4 is slid endwise, it will be noted that the frame 1 of the vehicle comprises a transverse brace 5, supporting a bracket 6, upon which is fulcrumed a bell crank lever 7. The fulcrum of the bell crank lever 7 is indicated by the reference character 8. At its rear end, as shown most clearly in Fig. 4, the bell crank lever 7 is equipped with spaced fingers 9 carrying approaching studs 10, adapted to be received in a grooved collar 11, secured to one end of the drum 4. Pivotally connected with the forward or transverse portion of the bell crank lever 7 is a link 12, pivoted to one end of a lever 14 fulcrumed as indicated at 15, upon the brace 5. A forwardly extended connecting rod 16 is pivotally connected at its rear end with one end of the lever 14, the forward end of the connecting rod 16 being pivotally connected with an upright lever 17, fulcrumed as indicated at 18 upon any accessible portion of the vehicle frame. The lever 17 is equipped with latch mechanism 19 adapted to engage with a frame supported segment 20. One end of the drum 4 terminates in a clutch 21, adapted to coöperate with a clutch 22, formed upon one side of a beveled pinion 23 which is carried by the shaft 3. Upon its outer side, the beveled pinion 23 is equipped with a bulb 24, having functions which will be set forth hereinafter. The beveled pinion 23 meshes into a beveled pinion 25, secured to a diagonally disposed shaft 26, united by means of a universal joint 27 with a longitudinally extended shaft 28, journaled for rotation in a frame supported hanger 29, and in another hanger 30, the hanger 30 being located within a casing 31 upheld upon any suitable portion of the frame 1.

Secured to the forward end of the shaft 28 and located within the casing 31 is a gear wheel 32, meshing into a gear wheel 33, splined for sliding movement upon a stub shaft 34, journaled for rotation in a bearing 35 which is supported by the casing 31. The gear wheel 33 meshes into a pinion 36 secured to the engine shaft 37, the engine being indicated by the reference character 38. The engine shaft 37 extends rearwardly and is operatively connected with the differential 39. It is obvious, however, that the means for propelling the vehicle may be changed without jeopardizing the present invention, since the same is adapted to be employed upon motor propelled vehicles of widely different sorts.

Extended transversely of the casing 31, as shown to best advantage in Fig. 6, is a shaft 40, upon which is fulcrumed a lever 41, provided with bifurcations 42, operatively connected with the grooved hub 43 of the gear wheel 33. Pivotally connected with the lower end of the lever 41 is a rearwardly extended link 44, pivoted to the depending arm 45 of a collar 47 which may be journaled upon a shaft 48. The collar 47 may be equipped with a pedal 49. A spring 46 is secured to any accessible portion of the vehicle frame, and is also connected with the depending arm 45, the function of the spring 46 being to hold the gear wheel 33 normally out of intermeshing relation with respect to the pinion 36 and with the gear wheel 32. If desired, the shaft 48 hereinbefore referred to, may be the shaft commonly found in automobiles of a well known type, the shaft 48 carrying the brake pedal 50. This detail, however, may be departed from without jeopardizing the utility of the invention, so long as a suitable support is provided for the collar 47 and accessory parts. The collar 47 is equipped with an upstanding arm 51 pivotally connected to a rearwardly extending link 52. The rear end of the link 52 is pivoted to one end of a lever 53 fulcrumed as indicated at 54 upon any desired portion of the vehicle frame. Operatively connected with the lever 53 is a brake strap 55, which surrounds the hub 24 of the beveled pinion 23 hereinbefore referred to.

Mounted upon the casing of the rear axle and upon the differential casing 39, or otherwise supported, is a bracket 66, upon which is journaled for rotation a roller 67. One end of a flexible element 68 is secured to the drum 4, the flexible element 68 being extended rearwardly around the roller 67, and thence being extended forwardly, beneath the vehicle. The forward end of the flexible element 68 is secured to a peg 69, driven in the ground to the front of the vehicle, or otherwise positioned as will be explained hereinafter.

In Fig. 8 a slight modification of the invention is shown. Referring to Fig. 8, the vehicle frame is denoted by the numeral 56, and in the frame 56 is journaled a shaft 57, supporting for rotation a drum 58, provided at one end with a collar 59, adapted to coöperate with the studs 10 upon the bell crank lever 7, the bell crank lever being shown in detail in Fig. 4. Formed integrally with the ends of the drum 58, or otherwise secured thereto are pinions 60. The drum 58 may be slid longitudinally upon the shaft 57, and thus the pinions 60 may be moved into and out of mesh with pinions 61 secured to a shaft 62 which is journaled for rotation in the vehicle frame 56 in front of the drum 58. The shaft 62 is provided with a beveled pinion 63, meshing into a beveled pinion 64, carried by a forwardly extended shaft 65, the shaft 65 corresponding to the shaft 28.

In practical operation, the pedal 49 is manipulated causing a rotation of the collar 47 upon the shaft 48, whereupon the arm 45 will be tilted, moving the link 44 and tilting the lever 41 upon its fulcrum 40 and imparting sliding movement to the gear wheel 33 along the stub shaft 34 so that the gear wheel 33 is brought into mesh with the pinion 36 and with the gear wheel 32. By this operation, the engine shaft 37 is coupled up operatively with the shaft 28.

By manipulating the lever 17, movement will be imparted to the connecting rod 16, the connecting rod actuating the lever 14, and the lever 14 through the instrumentality of the link 12 actuating the bell crank lever 7, the studded fingers 9 of which, engaging the collar 11 of the drum 4, will slide the drum 4 longitudinally on the shaft 3, so that the clutch members 21 and 22 are coupled up operatively.

Recalling that the flexible element 68 is secured at one end to the drum 4 and is extended rearwardly around the roller 67, and thence forwardly beneath the vehicle into connection with the peg 69, it will be obvious that when the engine 38 is in operation, motion will be transmitted through the following elements:—the engine shaft 37, the pinion 36, the gear wheel 33, the gear wheel 32, the shaft 28, the universal joint 27, the shaft 26, the beveled pinion 25, the beveled pinion 23, the clutch member 21, and thence into the drum 4. When rotation is imparted into the drum 4 in this manner, the flexible element 68 will be drawn upon, and owing to the fact that the forward end of the flexible element 68 is secured to the peg 69, the vehicle will be advanced out of any position in which it may be lodged.

It is entirely obvious, that if desired, the peg 69 instead of being placed in front of the vehicle, may be placed to one side of the vehicle. Upon the peg 69, when the same is placed at the side of the vehicle, may be mounted a pulley block. The flexible element 68 may be rove through this pulley block, the forward end of the flexible element being connected with the front portion of the vehicle. In this manner, when the invention is put in operation as above described, the vehicle may be pulled sidewise. This operation will be useful when it is desired to drag the vehicle sidewise out of a ditch, or to restore to a road way, a vehicle, the wheels of which, at one side, are so far over a precipice as to render dangerous the restoration of the vehicle to the road way in the ordinary manner.

It is obvious that by manipulating the bell crank lever 7, the clutch members 21 and 22 may be disengaged and thus the drum 4 will be prevented from rotating when the engine 38 is in operation. However, in order to prevent wear and tear, and to prevent an unnecessary loading of the engine, the gear wheel 33, through the medium of the lever 41 and accessory parts or due to the tension of the spring 46, may be slid upon the stub shaft 34, out of mesh with the gear wheel 32 and the pinion 36. By this operation, that portion of the driving mechanism which comprises the pinion 32, the shaft 28, the shaft 26, the beveled pinion 25, and the beveled pinion 23 will remain at rest when the engine 38 is in operation. When the engine 38 is in operation, the full force of the engine should not be applied, at the inception of the drive to the drum 4. A slight movement of the pedal 49 will serve to move the gear wheel 33 into mesh with the pinion 36 and into mesh with the pinion 32, thus coupling up the drum 4 coöperatively with the engine 38. Further movement of the pedal 49, however, will serve to actuate the lever 53 through the medium of the link 52 and the arm 51, to such an extent that the brake strap 55 will coöperate with the hub 24 of the beveled pinion 23. By this operation, a braking pressure will be applied to the drum 4, which pressure may be eased off by a proper manipulation of the pedal 49, so soon as the vehicle is in motion.

That form of the invention which is shown in Fig. 8 does not differ greatly from the form of the invention hereinbefore described. It is entirely obvious, referring to Fig. 8, that when the drum 58 is slid longitudinally, the pinions 60 will come into mesh with the pinions 61, and thus motion will be transmitted from the shaft 65 into the beveled pinions 64 and 63, and thence from the shaft 62 into the drum 58 by way of the intermeshing pinions 61 and 60.

Having thus described the invention, what is claimed is:—

1. In a device of the class described, a frame; a drum movably mounted thereon; a flexible element operatively connected with the drum; driving means operatively connected with the drum; an engine; a clutch operatively connecting the engine with the driving means; a brake controlling the drum; and a single means for actuating the clutch and the brake.

2. In a device of the class described, a frame; a drum movably mounted thereon; a flexible element operatively connected with the drum; driving means; mechanism for producing relative movement between the drum and the driving means to connect and disconnect the drum and the driving means; an engine; a clutch operatively connecting the engine with the driving means; a brake controlling the drum; and a single means for actuating the clutch and the brake.

3. In a device of the class described, a frame; a drum journaled thereon; a flexible element connected operatively with the drum; an engine shaft; an engine connected with the engine shaft; a second shaft operatively connected with the drum; gear wheels upon the shafts; a pinion movable into and out of mesh with the gear wheels; a brake controlling the drum; and a single mechanism controlling both the brake and the pinion.

4. In a device of the class described, a frame; a drive shaft journaled thereon; a drum supported for rotation by the frame; a brake controlling the drum; a second shaft journaled on the frame; means for operatively connecting the second shaft with the drum; gear wheels on the shafts; a pinion supported for sliding movement into and out of engagement with the gear wheels; a third shaft supported on the frame; means under the control of the operator for actuating the third shaft; arms projecting from the third shaft; means for operatively connecting one arm with the brake; and means for operatively connecting the other arm with the pinion.

In testimony that we claim the foregoing as our own, we have hereto affixed our signatures in the presence of two witnesses.

EARTHEN H. CAMFIELD.
CHRISTIAN O. NIELSEN.

Witnesses:
WILLIAM O. SMOCK,
ELSIE H. CAMFIELD.